July 1, 1947.  I. H. MILLER  2,423,333
CAP FEEDING DEVICE
Original Filed June 23, 1942   4 Sheets-Sheet 1

INVENTOR
I. H. Miller,
BY
ATTORNEYS

July 1, 1947.   I. H. MILLER   2,423,333
CAP FEEDING DEVICE
Original Filed June 23, 1942   4 Sheets-Sheet 2

INVENTOR
I. H. Miller,
BY Rule & Hoge
ATTORNEYS

July 1, 1947.  I. H. MILLER  2,423,333
CAP FEEDING DEVICE
Original Filed June 23, 1942    4 Sheets-Sheet 3
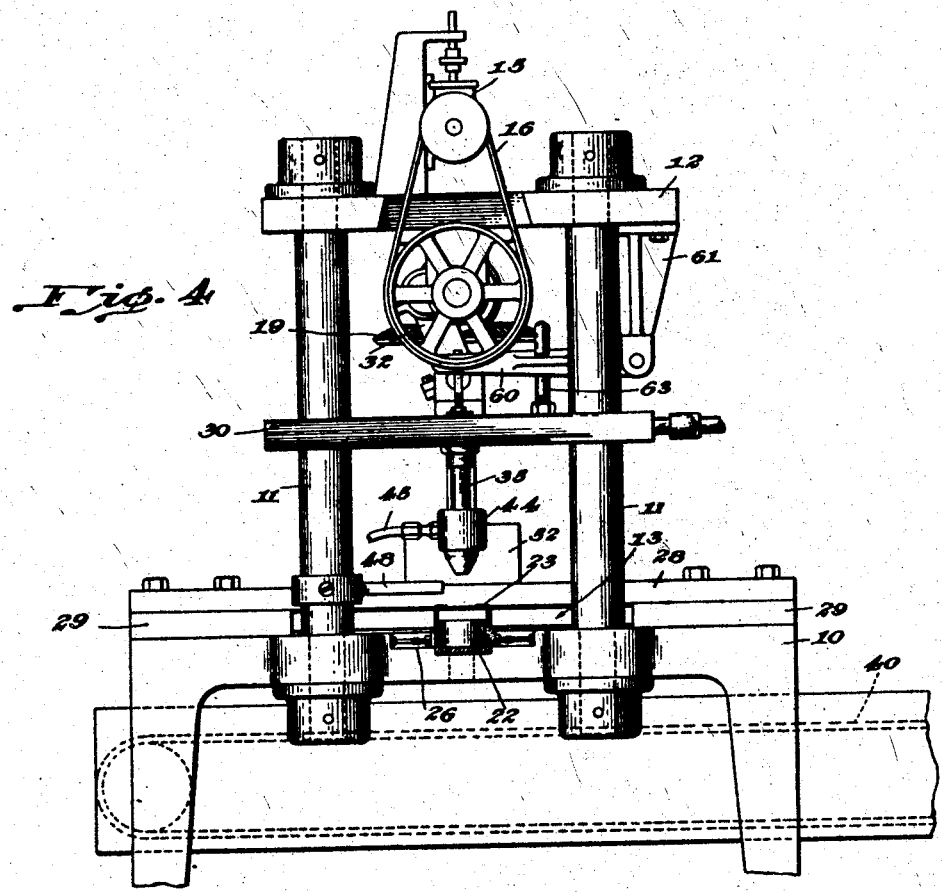
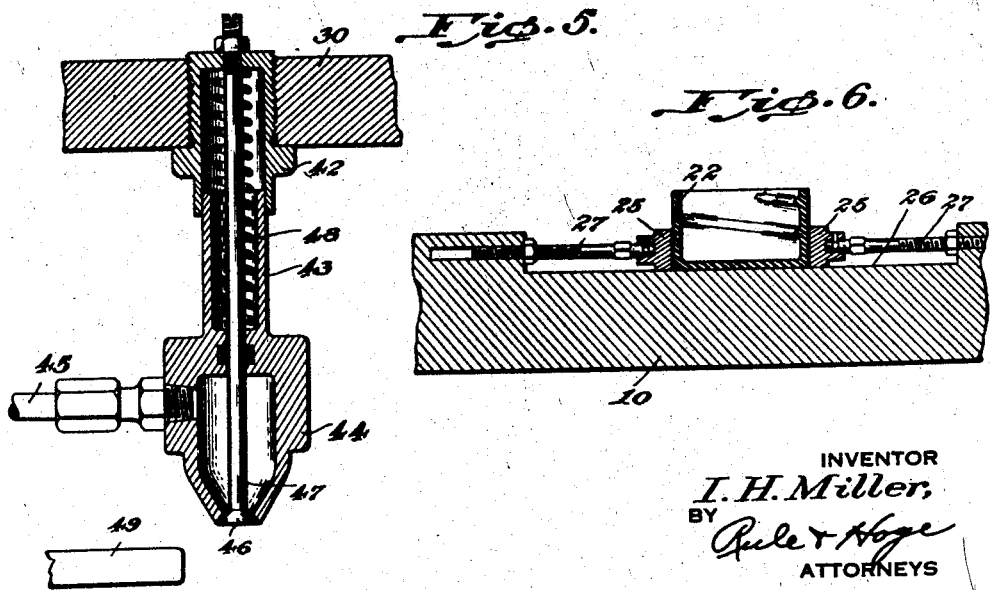
INVENTOR
I. H. Miller,
BY
ATTORNEYS INVENTOR
I. H. Miller,
BY
ATTORNEYS Patented July 1, 1947

2,423,333

UNITED STATES PATENT OFFICE 2,423,333

CAP FEEDING DEVICE

Ira H. Miller, Toledo, Ohio, assignor to Owens-Illinois Glass Company, a corporation of Ohio Original application June 23, 1942, Serial No. 448,177. Divided and this application December 9, 1944, Serial No. 567,392

7 Claims. (Cl. 113—114)

My invention relates to a machine for placing liners in caps for use as closure devices for bottles or other containers.

An object of the invention is to provide a machine adapted to receive caps simultaneously from two different chutes or sources of supply, feed them inwardly toward a discharging station during the assembling of the liners therewith, and discharge them to a conveyor by which they are carried from the machine.

A further object of the invention is to provide a novel form of feeder cam by which two rows of caps may be fed concurrently from opposite sides of the machine during the lining operations and discharged to a common conveyor at a discharging station located centrally of the cam.

Other objects of the invention will appear hereinafter.

Referring to the accompanying drawings:

Fig. 4 is a side elevation of the machine.

Fig. 5 is a sectional view of a glue feeder.

Fig. 6 is a sectional detail showing adjustable guides for the caps.

Figure 1:
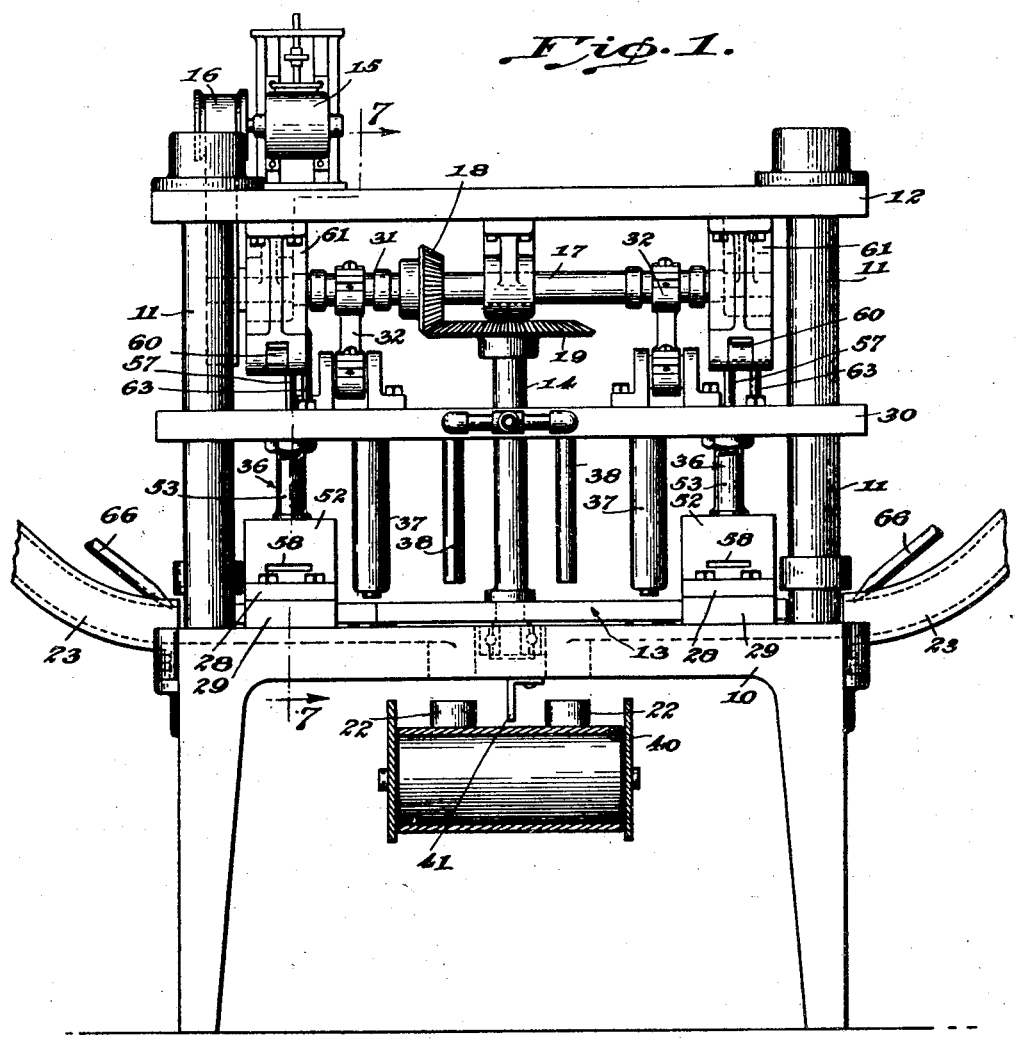
Fig. 1 is a front elevation of the machine.

This application is a division of my copending application, Ser. No. 448,177, filed June 23, 1942, for Lining machines.

The framework of the machine comprises a base 10, posts 11 rigidly secured thereto, and an upper platform 12 mounted on said posts. A feeder cam 13, by which the caps are fed inwardly from opposite sides of the machine toward the center during the assembling operations, is attached to a vertical cam shaft 14, the lower end of which is journalled in the machine base 10. The shaft 14 and cam are rotated continuously by an electric motor 15 mounted on the platform 12. Driving connections for the cam shaft include a belt 16, a horizontal shaft 17 driven thereby and intermeshing bevel gears 18 and 19 on the shafts 17 and 14 respectively.

The cam 13 is in the form of a pair of cam arms 20 and 20ᵃ which are integrally united and connected to the shaft 14. These arms extend spirally outward from the shaft and are shaped to form spiral passageways 21 and 21ᵃ of a width to accommodate caps 22 which are fed to the machine through chutes 23 positioned at opposite sides of the machine. The chutes register with runways or guideways 24 extending inwardly toward the center of the machine. Each runway is formed by means of a pair of guide strips 25 which are set in a recessed section 26 of the machine base. The guide strips are separately adjustable laterally by means of screw-threaded adjusting rods 27 (Fig. 6). This permits the guideways to be accurately adjusted in respect to the feeder cams and also permits the width to be adjusted to accommodate caps of different sizes.

The feeder cam is positioned over and close to the machine base 10. Narrow plates or bars 28 overlie said base and are spaced therefrom by spacing blocks 29. The spiral cam grooves 21 and 21ᵃ are shaped to provide dwell portions concentric with the shaft 14 so that the movement of the caps 22 under the control of the cam arms is intermittent as more fully set forth hereinafter.

Figures 2, 3:
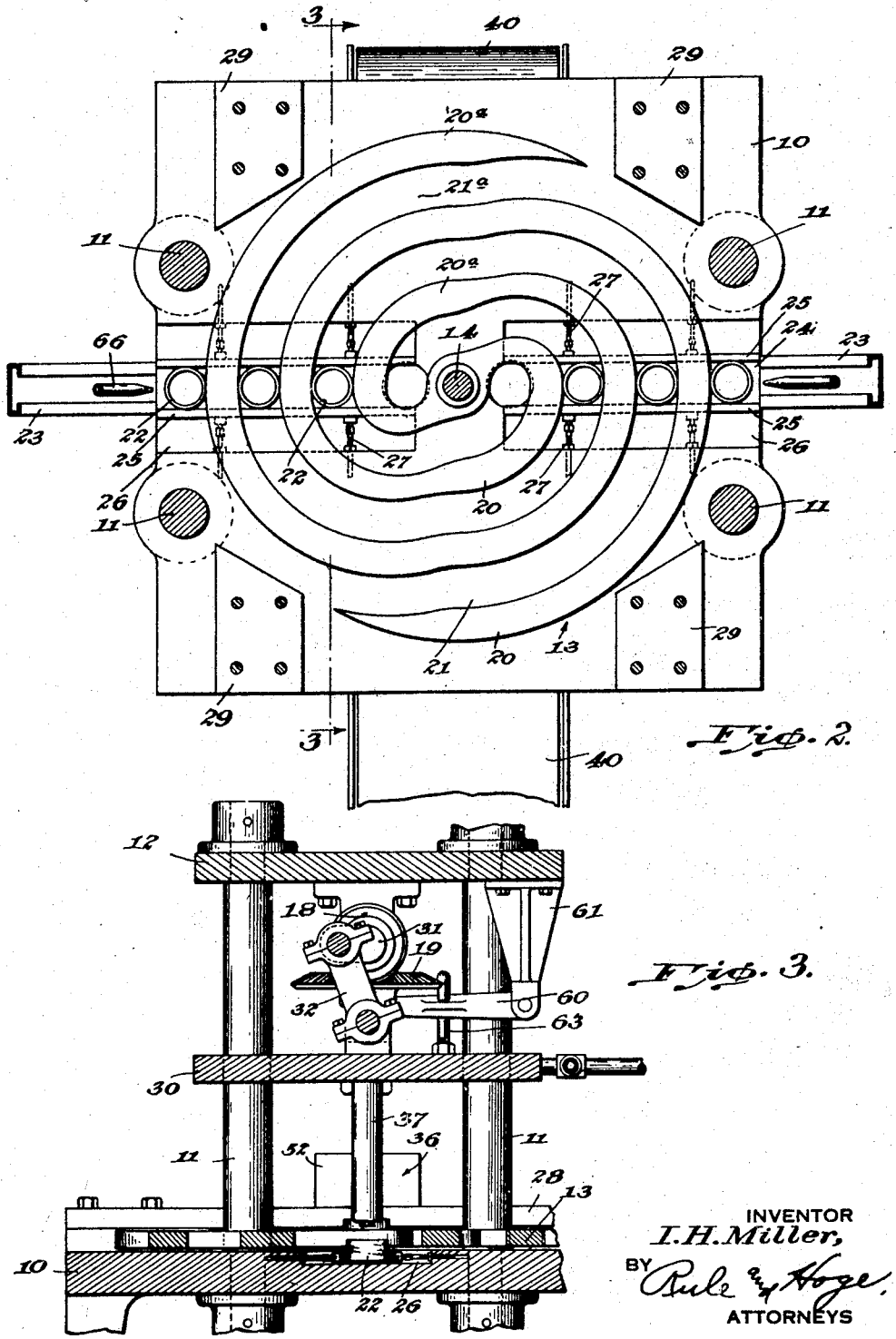
Fig. 2 is a part-sectional plan view showing particularly the feeder cam.
Fig. 3 is a section at the line 3—3 on Fig. 2.

Each of the cam arms 20 and 20ᵃ serves a double function. Thus the arm 20, for example, operates as a cam for feeding the caps inwardly from the left-hand side of the machine (Fig. 2), and also serves as a backing for the caps which are being fed from the right-hand side of the machine, holding said caps against the other cam arm 20ᵃ. Conversely, the arm 20ᵃ feeds the caps inwardly from the right-hand side while the arm 20 holds the caps in contact with the arm 20ᵃ.

Slidably mounted on the posts 11 for up-and-down movement is a carrier plate 30 positioned between the upper platform 12 and the base 10. Cranks 31 on the shaft 17 are connected to the carrier plate 30 through connecting rods 32 for reciprocating said plate vertically. The gearing between the crank shaft 17 and the cam drive shaft 14 is proportioned to give two complete rotations of the shaft 17 for each rotation of the cam.

Mounted in pairs on the underside of the carrier plate 30 are assembly devices including glue droppers 35, punches 36, liner pounders 37 and blower pipes 38, all in horizontal alignment and positioned directly over the channels 24. Each cap is advanced step by step to stations at which it is positioned directly beneath and in register with one of the devices of each of said pairs in succession. The glue droppers inject a drop or more of glue into each cap as it is fed thereunder. Each cap at the next succeeding step movement inwardly is brought beneath the punch which operates to cut a liner disk from a strip of lining material and carry it downward into the cap therebeneath. At the next station the pounder 37 operates to tamp the liner securely in place within the cap. This completes the assembly operation and at the next station the cap is discharged onto a conveyor 40. A jet of air supplied through the blower pipe 38 insures the proper transfer of the cap to the conveyor. The latter may be a continuously traveling belt conveyor directly beneath the machine base 10, traveling in a direction transverse to the channels 24 and of a width to receive the caps from both sides of the machine. As the caps fed into the machine from opposite sides may be of different construction or design, it is sometimes desirable to keep the two rows separate on the belt 40 so that they may be discharged into separate containers. For this purpose a partition strip 41 (Fig. 1) may be positioned over the conveyor.

The glue dropper as shown in Fig. 5 comprises upper and lower tubular sections 42 and 43 which telescope, the upper section being screw threaded into the carrier plate 30. The lower section is in the form of a chambered head 44 into which glue or other liquid adhesive is fed under pressure through a pipe 45. The lower end of the head 44 is in the form of a nozzle which is opened and closed by means of a valve 46 having a valve stem 47 extending upwardly through the dropper and threaded through the section 42. A coil spring 48 holds the valve closed. When the carrier plate 30 is moved downward the nozzle is carried downwardly into or in close proximity to the cap 22. A stop arm 49 attached to one of the posts 11 and adjustable up and down thereon, is positioned to engage and stop the head 44 shortly before the carrier plate completes its downward movement, so that the valve 46 is opened during such movement and permits the discharge of glue into the cap 22. As the plate 30 rises, the spring 48 closes the valve.

Figures 7, 8:
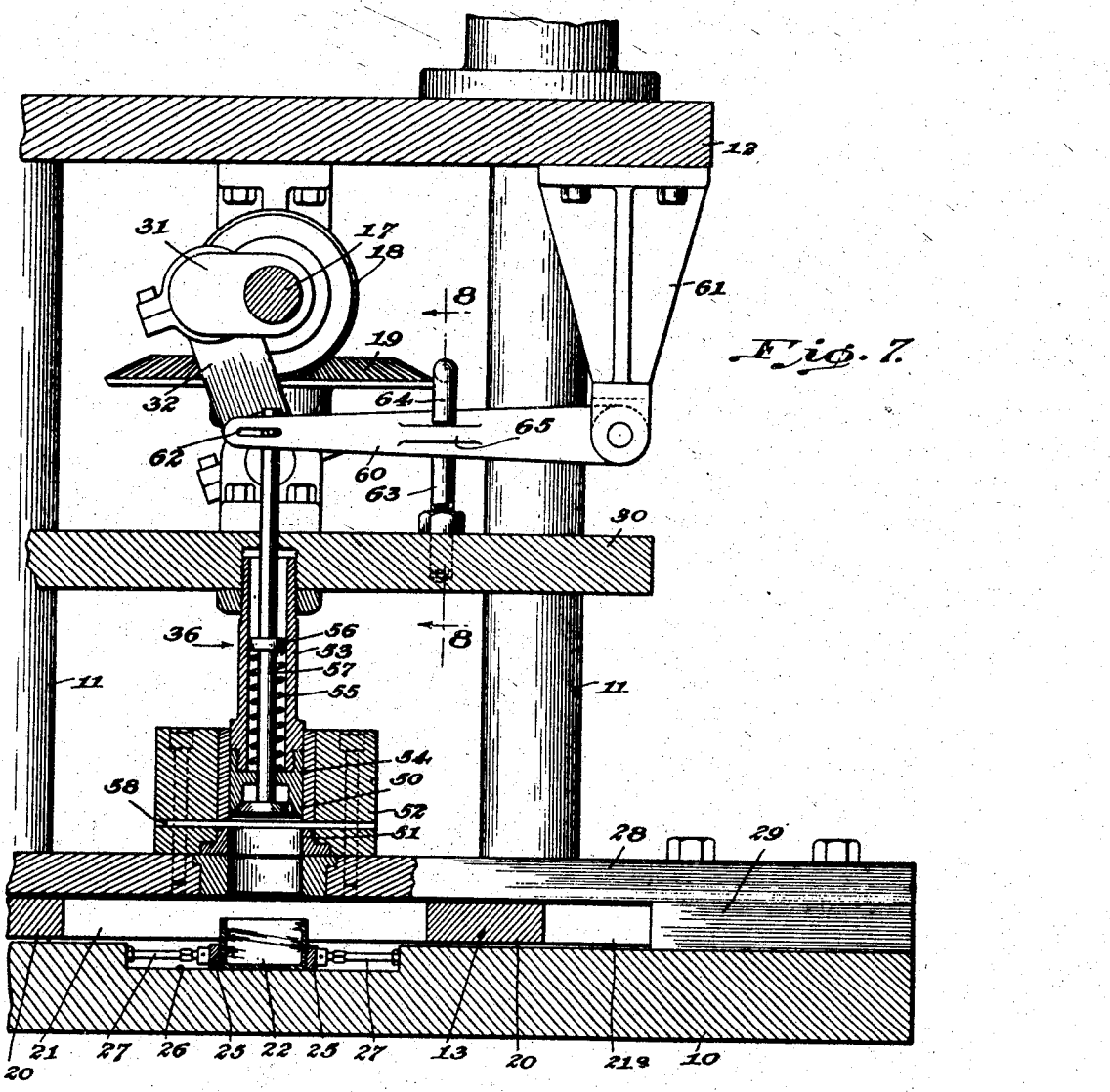
Fig. 7 is a sectional elevation at the line 7—7 on Fig. 1.
Fig. 8 is a section at the line 8—8 on Fig. 7.

At the next station a liner is punched from a stock strip and introduced into the cap. The punch and die mechanism as shown in Fig. 7 comprises a punch 50 and an annular die 51, the latter mounted in a block 52 bolted to the plate 28. The punch is moved downwardly with the carrier plate 30 by means of a tubular rod 53, the upper end of which has a screw-threaded connection with the plate 30 and the lower end of which has attached thereto a head 54. The lower end of said head provides an annular seat for the punch 50 which is held to its seat by a coil spring 55 which is held under compression between the head 54 and a collar 56 on the stem 57 of the punch 50.

The liners are cut from a strip of stock which is fed through a slot 58 extending through the block 52. In addition to the downward movement imparted to the punch 50 by the plate 30, it is given a further movement by means comprising a rock arm 60, one end of which is pivoted to a bracket 61 mounted on the underside of the platform 12 and the other end of which has a slot and pin connection 62 with the stem 57. The downward swinging movement of the rock arm by which the punch is moved downwardly away from the head 54, is controlled by a rod 63 (Figs. 7 and 8) mounted on the carrier plate 30. The upper end 64 of the rod overhangs a stop lug 65 formed on the rock arm.

In operation, the punch 50 is carried downwardly with the plate 30 to an intermediate position as shown in Fig. 7 and in cooperation with the die ring 51 severs a liner disk from the stock strip. During this downward movement the punch is held against the head 54 by the spring 55 until the rod 63 engages the lug 65. The continued movement of the plate 30 then operates through the rod 63 to swing the rock arm about its pivot and thereby move the punch 50 downward at a higher speed than the plate 30, thus carrying the liner disk rapidly downward into the cap therebeneath.

When the cap with the liner therein is advanced to the next station it is brought beneath the tamping device or pounder 37 which operates to tamp the liner in the cap so that it is securely held by the adhesive previously applied through the dropper 35. At the next station the cap is discharged onto the conveyor 40. This operation is assisted by the pipe 38 which may serve as a pusher if the cap fails to drop by gravity. The air jet supplied through said pipe operates further as a pusher after the cap is out of contact with the pipe.

The caps may be fed to the machine by gravity through the chutes 23. In order to hold the caps securely against the feeder cam until they have entered the guideways 21 and 21ª, air jets may be directed against the caps through pipes 66.

The feeder cam is so shaped that the caps are held stationary by the dwell portions thereof while the carrier plate 30 is within the lower portion of its range of movement, during which time the several assembling operations are taking place. The caps are fed inwardly while the carrier plate 30 is in its lifted position or the upper portion of its path of movement. It will be noted that the crank shaft 17 makes a complete rotation while the feeder cam makes one half of a complete rotation and during this time both rows of caps are fed inwardly one step so that a pair of caps is discharged to the conveyor 40.

Modifications may be resorted to within the spirit and scope of my invention.

I claim:

1. A lining machine comprising a flat cam shaped to provide a spiral passageway lying in a single plane, means for rotating the cam about an axis perpendicular to said plane, and means for feeding caps to the cam at opposite sides of said axis, said cam being shaped to advance caps toward said axis simultaneously from opposite sides thereof.

2. A lining machine comprising a horizontal straight guideway for holding and directing caps in a straight line, a horizontal spiral cam positioned over said guideway, and means for rotating the cam about an axis perpendicular to and intersecting said line, the cam having a plurality of spiral cam surfaces each extending spirally inward from the periphery of the cam toward said axis, the outer ends of said cam surfaces being symmetrically spaced at intervals along said periphery and at equal distances from said axis, the cam surfaces being shaped to advance the caps along said guideway toward said axis.

3. A lining machine comprising a horizontal straight guideway for holding and directing caps in a straight line, a horizontal spiral cam positioned over said guideway, and means for rotating the cam about an axis perpendicular to and intersecting said line, the cam having a plurality of spiral cam surfaces each extending spirally inward from the periphery of the cam toward said axis, the outer ends of said cam surfaces being symmetrically spaced at intervals along said periphery and at equal distances from said axis, the cam surfaces being shaped to advance the caps along said guideway toward said axis, the said cam surface being provided with dwell portions concentric with said axis whereby the movement imparted to caps is intermittent.

4. A lining machine comprising straight runways extending from opposite sides of the machine toward the center thereof, a feeder device comprising spiral cam arms mounted for rotation about an axis between and perpendicular to said runways, means for rotating the cam arms and thereby causing them to feed caps inwardly concurrently from opposite sides of the machine through said runways, a horizontally-disposed traveling conveyor extending through the center of the machine, beneath and transversely of said runways, and means for transferring the caps from said runways and positioning them on said conveyor in separate rows individual to said runways.

5. A lining machine comprising in combination, a vertical cam shaft, a cam secured thereto, means for rotating the shaft and cam, said cam comprising spiral cam arms extending from said shaft and arranged in the same horizontal plane, straight runways adjacent to and parallel with said cam, said runways being shaped to receive caps and hold them in the path of the cam arms and guide them inwardly toward said shaft as they are advanced along the runways by the cam arms.

6. A lining machine comprising a horizontal cam, means for rotating it about a vertical axis, said cam comprising a pair of spiral cam arms extending spirally from said axis and spaced to provide spiral cam passageways of substantially uniform width throughout their length, the outer ends of said arms and of said grooves terminating at diametrically opposite points along the periphery of the cam, means providing horizontal guideways arranged in a straight line beneath said cam with their inner ends adjacent to said axis, said guideways being shaped and positioned for holding caps in the paths of the cam arms and guiding them inwardly toward said axis in a straight line as they are advanced along the spiral passageways by the rotating cam arms.

7. A lining machine comprising a horizontal cam, means for rotating it about a vertical axis, said cam comprising a pair of spiral cam arms extending spirally from said axis and spaced to provide spiral cam passageways substantially of uniform width throughout their length, the outer ends of said arms and of said grooves terminating at diametrically opposite points along the periphery of the cam, means providing horizontal guideways arranged in a straight line beneath said cam with their inner ends adjacent to said axis, said guideways being shaped and positioned for holding caps in the paths of the cam arms and guiding them inwardly toward said axis in a straight line as they are advanced along the spiral passageways by the rotating cam arms, said arms and cam tracks being formed with dwell portions at diametrically opposite positions with respect to said axis, whereby the movement imparted to the caps is intermittent and the caps in both said guideways are arrested during the same time intervals.

IRA H. MILLER.

REFERENCES CITED

The following references are of record in the file of this patent:

UNITED STATES PATENTS

| Number | Name | Date |
| --- | --- | --- |
| 887,883 | Wheeler | May 19, 1908 |
| 1,869,480 | Johnson | Aug. 2, 1932 |
| 1,387,037 | Binder | Aug. 9, 1921 |
| 2,138,923 | Johnson | Dec. 6, 1928 |
| 1,858,695 | Weisenburg | May 17, 1932 |
| 2,342,621 | Elder | Feb. 22, 1944 |